Patented Dec. 12, 1933

1,939,222

UNITED STATES PATENT OFFICE 1,939,222

PROCESS FOR THE RECOVERY OF MATERIALS CONTAINED IN GASEOUS MIXTURES

Donald F. Othmer, Rochester, N. Y., assignor to Eastman Kodak Company, Rochester, N. Y., a corporation of New York No Drawing. Application January 19, 1931
Serial No. 509,874

3 Claims. (Cl. 260—134)

This invention relates to a process of recovering materials of greater or less volatility such as alcohols, acetone, camphor, and a naphthalene from gaseous mixtures by the solvent action of beta-beta'-dichlorethyl ether.

In several industrial processes there are carried off various valuable materials in gaseous form which may be recovered by my process. The manufacture of various plastic cellulosic compositions has necessitated the loss to the carrier gas of large amounts of camphor, which may amount to 7% of the weight of the camphor used in addition to vapors such as ether, alcohol, acetone, amyl acetate, etc.; these may be recovered by employing my invention. The destructive distillation of coal gives off gas which contains naphthalene and other hydrocarbon vapors which may be collected from the coal gas by the present process. This invention may be applied to any gas regardless of the source, which contains the vapors of the materials which are absorbed or dissovled in beta-beta' dichlorethyl ether.

There has been previously known the process of collecting camphor or naphthalene vapors by means of phenolic materials from gaseous mixtures containing the vapors of either or both. The present invention is, however, more economical than the process using phenolic bodies. The collecting or absorbing material in the present invention is more readily prepared and used in pure form than the various cresol oils which have been previously used, and it may be utilized without the decomposition or resinification which accompanies the use of cresolic materials.

In previous processes of removing solvent vapors such as acetone, ethyl, methyl and butyl alcohols, etc., water is the liquid that has usually been employed as an absorbing medium. The use of water has several disadvantages such as (1) high latent heat (2) high specific heat and (3) a boiling point not greatly removed from that of the low boiling materials to be recovered making separation of most of these solvents expensive and difficult. The absorbing material used in the present invention, however, is free of all these disadvantages which accompany the use of water as the absorbent.

I have found that the vapors of camphor, naphthalene or solvent vapors such as acetone, alcohols, etc., may be recovered by the use of beta-beta' dichlorethyl ether, or a liquid containing the same, as the absorbing material.

It is to be understood that other liquids may be present in or mixed with the dichlorethyl ether so long as they do not impair the value of the process. For example, a certain amount of phenolic bodies or other absorbent materials may be added or may be already present, and would obviously add their particular properties to the solvent, or various foreign substances, whether of value or not in enhancing the utility of the dichlorethyl ether could be present in this process. The vapors of the material mentioned may be recovered from the gaseous mixtures either when they are present with other vapors such as some types of hydrocarbons for example or when present only by themselves in the carrier gas.

Any suitable type of washing or absorbing equipment may be utilized for the absorbing of the vapors. The type of apparatus to be used depends on the particular vapor which is to be absorbed. The separation of the absorbed substances from the dichlorethyl ether may be accomplished by heating or distilling by which means the vapors may be driven off and then condensed.

The partial vapor pressure of the absorbed material out of the liquid in which it is absorbed is the best criterion of the liquid's absorbing efficiency in the recovery thereof since this partial pressure represents the optimum or equilibrium concentration which can be realized in the absorbing solution. Thus, the vapor pressure of a given amount of the material being recovered is lower out of dichlorethyl ether than out of water. By way of comparison, the vapor pressure of 5% of acetone in water is approximately 22. m. at 28° C.; while the vapor pressure of 5% of acetone in dichlorethyl ether is approximately 18 m. m. at 28° C. It is evident, therefore, that the absorbing liquid forming the solution with acetone, having the lower vapor pressure at a given concentration and temperature is the better liquid for use in the operation since the same quantity of dichlorethyl ether will reduce the acetone-gas mixture to a lower vapor pressure than if water were used. In other words, less dichlorethyl ether than water will have to be utilized to make a solution having the same vapor pressure as the vapor pressure of the acetone in the gases to be scrubbed.

In any gas washing system the lowest concentration of volatile materials to which the vapor laden air may possibly be reduced is determined by the partial pressure of the volatile material from the weakest solution which may be employed. The rate of absorption throughout any such system is determined by the difference between the partial pressure of the vapor in the gaseous and liquid phases. This difference is a measure of the "driving force" tending to make the absorption take place. In practice the vapor pressure in the gaseous phase is always greater than that in the liquid phase; but this difference becomes less and less as equilibrium is approached.

It will be observed, therefore, that a much smaller quantity of dichlorethyl ether will be required for absorbing a given amount of vapor from air than would be required of water. This advantage, in addition to the heat economy in the subsequent distillation makes dichlorethyl ether much the best liquid so far considered for this work.

What I now claim as my invention and desire to secure by Letters Patent of the United States is:

1. The process of recovering a vaporized aliphatic ketone from a gaseous mixture containing the same, which comprises absorbing the vaporized ketone in beta-beta' dichlorethyl ether, separating the absorbed ketone from the absorbent by distillation, and recovering the same by condensation.

2. The process of recovering vaporized acetone from a gaseous mixture containing the same, which comprises absorbing the acetone vapor in beta-beta' dichlorethyl ether, separating the acetone from the absorbent by distillation, and recovering the acetone by condensation.

3. The process of recovering vaporized acetone from a gaseous mixture containing the same, which comprises passing the mixture countercurrently to a stream of beta-beta' dichlorethyl ether, whereby a solution of ether is obtained, distilling the acetone from the solution, and recovering the acetone by condensation.

DONALD F. OTHMER.